Patented Mar. 17, 1953

2,631,962

UNITED STATES PATENT OFFICE 2,631,962

INSECTICIDAL COMPOSITION COMPRISING A GLYCOL AND AN INSECTICIDAL PHOSPHATE

Joseph B. Moore, Edina, Minn., assignor to McLaughlin Gormley King Company, Minneapolis, Minn., a corporation of Minnesota No Drawing. Application November 17, 1948, Serial No. 60,629

9 Claims. (Cl. 167—22)

This invention relates to insecticidal compositions and particularly to those having pronounced acaricidal properties. The invention also relates to compositions of this character capable of being diluted in water to form solutions or dispersions which are effective against a variety of insects and particularly against mites, such as Pacific *Tetranychus pacificus* (McG.); European red *Paratetranychus pilosis* (C. & F.); rust Eriophiydae; citrus red, *Paratetranychus citri* (McG.); purple, six-spotted *Tetranychus sexmaculatus* (Riley); and brown mites *Bryobia praetiosa* (Koch) on citrus trees, apples and pears and other deciduous and coniferous trees and on shrubs and grapes.

It is an object of the invention to provide an improved insecticidal-acaricidal composition of especial effectiveness against mites capable of use in dilute form where the carrier is water.

In preparing the insecticidal-acaricidal compositions there is used an alkylene glycol, such as propylene glycol, ethylene glycol, thioalkylene glycols and other lower aliphatic glycols containing from 2 to 6 carbon atoms, which are liquid at normal temperatures in admixture with phosphate compounds selected from the group consisting of tetraethylpyrophosphate, diethyl p-nitrophenyl thiophosphate, commonly known as Parathion, which are also normally liquid. The resultant glycol-phosphate insecticidal-acaricidal compositions are clear homogeneous solutions which are readily miscible with water to infinite dilution. In general the insecticidal-acaricidal compositions described above are prepared by mixing 1 to 4 parts by weight of the glycol with 1 to 4 parts by weight of the phosphate of the type referred to above and may be composed of only these two ingredients.

The insecticidal-acaricidal composition of the present invention is useful for wet spraying purposes. For this purpose the mixture of the glycol and the phosphate is diluted extensively with water. Considerable variation is possible in the amount of water, depending upon the type of spraying methods of the particular operator using the composition, as well as the results that are desired to be accomplished. In general, however, it has been found desirable to use from 1 to 3 quarts of the concentrated insecticidal-acaricidal composition per 100 gallons of water in the final spraying material. Generally, however, it is desirable to include a spreader, such as calcium caseinate, which is sold under the trade-mark "Fluxit." It is preferred to use from ⅛ to ½ pound calcium caseinate spreader for each quart of glycol-phosphate mixture.

The glycol employed in this particular relationship has a pronounced synergistic effect in respect to the phosphate, the killing effect of the composition herein described being greater than that of either ingredient alone.

The diluted compositions are of exceptional value for use as agricultural sprays, particularly for controlling infestation of mites, aphids, apple leaf hoppers, Pacific and European red mites and the eggs of these insects. The glycol-phosphate composition spray of the present invention does have an exceedingly rapid effect upon the eggs of the Pacific and European red mites and causes the eggs to be collapsed within a matter of 4 to 5 hours, as compared with no egg kill with prior phosphate sprays. Moreover, the spray appears to have no deleterious effect upon the plant material treated therewith and overcomes serious disadvantages due to spotting of fruit, darkening of skin and blackening of the lenticils of pears occasioned by the use of other tetraethylpyrophosphate-containing sprays. None of these defects occur in connection with the glycol-phosphate compositions of the present invention.

A further advantage of the present invention resides in the fact that the glycol-phosphate composition is compatible with DDT and accordingly this material may be added to the glycol-phosphate composition without disturbing the effectiveness of the remaining ingredients. It is apparent, of course, that compositions containing DDT also destroy predators of mites and the like. However, these compositions are useful where it is desired to have a composition which is effective against other insects than those listed herein.

By way of further illustrating the invention, but without limitation thereon, reference is made to the following examples:

Example I

Ethylene glycol, one pint.
Diethyl p-nitrophenyl thiophosphate (15% wettable powder), one-half pound.

For use the composition is diluted in from 100 to 500 gallons of water and utilized in the customary manner as a spray. When diluted in 100 gallons of water, the spray was especially effective against mites, aphids and mealy bugs.

Example II

Propylene glycol, one pint.
Technical tetraethylpyrophosphate containing 40% tetraethylpyrophosphate, one-half pint.

For use this composition is diluted in from 100 to 500 gallons of water and utilized in the customary manner as a spray. When diluted in 100 gallons of water the spray is especially effective against Pacific, European red, brown, rust and two-spotted mites and against woolly, green and rosy aphids, and is slightly more effective than the spray composition of Example I.

*Example III*

Diethylene glycol, one pint.
Technical tetraethylpyrophosphate (containing 40% tetraethylpyrophosphate), one-half pint.

For use this composition is diluted in from 100 to 500 gallons of water and utilized in the customary manner as a spray. When diluted in 100 gallons of water the spray is especially effective against Pacific, European, red, brown, rust and two-spotted mites and against woolly, green and rosy aphids.

*Example IV*

Triethylene glycol, one pint.
Technical tetraethylpyrophosphate (containing 40% tetraethylpyrophosphate), one-half pint.

For use this composition is diluted in from 100 to 500 gallons of water and utilized in the customary manner as a spray. When diluted in 100 gallons of water the spray is especially effective against Pacific, European, red, brown, rust and two-spotted mites and against woolly, green and rosy aphids.

*Example V*

Thiodiethylene glycol, one pint.
Technical teteraethylpyrophosphate (containing 40% tetraethylpyrophosphate), one-half pint.

For use this composition is diluted in from 100 to 500 gallons of water and utilized in the customary manner as a spray. When diluted in 100 gallons of water the spray is especially effective against Pacific, European, red, brown, rust and two-spotted mites and against woolly, green and rosy aphids. The composition is slightly more effective than those specified under Examples I–IV.

Any of the foregoing compositions may be diluted either in water or petroleum fractions, such as deodorized kerosene and applied to diatomaceous earth. The particular dilutions utilized may be varied in accordance with the strength of the finally prepared dusting powder that is made. Thus, the composition may be applied either full strength or dilute to diatomaceous earth. The thus treated diatomaceous earth was then further diluted with one part of treated diatomaceous earth to 19 parts of talc and was especially effective as plant dust.

While various embodiments of the invention have been described in detail it is to be understood that the same is not limited thereto but that further modifications are possible without departing from the spirit of the invention.

What I claim is:

1. A water miscible spray insecticidal composition comprising an alkylene glycol containing from 2 to 6 carbon atoms and an insecticidal phosphate material selected from the group consisting of tetraethylpyrophosphate, and diethyl-p-nitrophenyl thiophosphate.

2. A water miscible spray insecticidal composition comprising 1 to 4 parts of an alkylene glycol containing from 2 to 6 carbon atoms and 1 to 4 parts of an insecticidal phosphate material selected from the group consisting of tetraethylpyrophosphate and diethyl p-nitrophenyl thiophosphate.

3. The composition of claim 1 further characterized in that the alkylene glycol is a thiodiethylene glycol.

4. A water miscible insecticidal spray composition comprising 1 to 4 parts of propylene glycol and 1 to 4 parts of an insecticidal phosphate material selected from the group consisting of tetraethylpyrophosphate and diethyl p-nitrophenyl thiophosphate.

5. A water miscible insecticidal spray composition comprising 1 to 4 parts of propylene glycol and 1 to 4 parts of tetraethylpyrophosphate.

6. A water miscible insecticidal spray composition comprising 1 to 4 parts of propylene glycol and 1 to 4 parts of diethyl p-nitrophenyl thiophosphate.

7. A method of controlling infestation of plant material infested with mites and mite eggs which comprises applying to said plant material an agricultural spray comprising a dilute aqueous solution of a composition containing an alkylene glycol having from 2 to 6 carbon atoms and insecticidal phosphate material selected from the group consisting of tetraethylpyrophosphate and diethyl p-nitrophenyl thiophosphate.

8. A method of controlling infestation of plant material infested with mites and mite eggs which comprises applying to said plant material a dilute aqueous solution containing propylene glycol and diethyl p-nitrophenyl thiophosphate in the proportions of from 1 to 4 parts of propylene glycol and from 1 to 4 parts of diethyl p-nitrophenyl thiophosphate.

9. A method of controlling infestation of plant material infested with mites and mite eggs which comprises applying to said plant material a dilute aqueous solution containing propylene glycol and tetraethylpyrophosphate in the proportions of from 1 to 4 parts of propylene glycol and from 1 to 4 parts of tetraethylpyrophosphate.

JOSEPH B. MOORE.

REFERENCES CITED

The following references are of record in the file of this patent:

Science, volume 93, Number 2409, pages 213 to 214, February 28, 1941.

Robertson et al., J. of Experimental Medicine, volume 75, Number 6, pages 593 to 610, June 1, 1942.

Manufacturing Chemist and Manufacturing Perfumer, volume XVIII, Number 11, November 1947, page 506.

Hoffman, J. Econ. Ent., volume 41, Number 3, pages 356 to 362, June 1948.

Smith et al., J. Econ. Ent., volume 41, Number 5, pages 624 to 630, August 1948.

Thurston, FIAT Final Report 949 entitled "Organic Chemical Intermediate for Insecticides, Fungicides and Rodenticides," bearing the date of October 14, 1946, pages 19, 20.